(12) United States Patent
Li et al.

(10) Patent No.: US 11,152,654 B2
(45) Date of Patent: Oct. 19, 2021

(54) BATTERY PACK

(71) Applicant: DONGGUAN POWERAMP TECHNOLOGY LIMITED, Guangdong (CN)

(72) Inventors: Yi Li, Guangdong (CN); Xiaoming Chen, Guangdong (CN)

(73) Assignee: Dongguan Poweramp Technology Limited, Dongguan (CN)

( * ) Notice: Subject to any disclaimer, the term of this patent is extended or adjusted under 35 U.S.C. 154(b) by 198 days.

(21) Appl. No.: 16/435,549

(22) Filed: Jun. 9, 2019

(65) Prior Publication Data
US 2020/0251791 A1 Aug. 6, 2020

(30) Foreign Application Priority Data

Jan. 31, 2019 (CN) .......................... 201920175872.X

(51) Int. Cl.
*H01M 10/613* (2014.01)
*H01M 10/6555* (2014.01)
(Continued)

(52) U.S. Cl.
CPC ....... *H01M 10/613* (2015.04); *H01M 10/617* (2015.04); *H01M 10/625* (2015.04);
(Continued)

(58) Field of Classification Search
CPC ......... H01M 10/6551; H01M 10/6555; H01M 10/659; H01M 50/647; H01M 10/613; H01M 10/617; H01M 10/625; H01M 10/647; H01M 50/209; H01M 50/20; H01M 50/211
See application file for complete search history.

(56) References Cited

U.S. PATENT DOCUMENTS

2012/0009455 A1 1/2012 Yoon
2012/0298433 A1* 11/2012 Ohkura ............ H01M 10/6555
180/65.1
(Continued)

FOREIGN PATENT DOCUMENTS

| CN | 102315501 A | 1/2012 |
| CN | 105409031 A | 3/2016 |
| JP | 2010272378 A | 12/2010 |

OTHER PUBLICATIONS

Google Patents machine translation of JP2010272378A. (Year: 2010).*

*Primary Examiner* — Gregg Cantelmo
(74) *Attorney, Agent, or Firm* — ScienBiziP, P.C.

(57) ABSTRACT

The present application discloses a battery pack including a first battery and a second battery arranged in a stack, the second battery being closer to a center of the battery pack than the first battery in a stacking direction of the first battery and the second battery, wherein the first battery includes a first thermally conductive component and a first electrode assembly, the second battery includes a second thermally conductive component and a second electrode assembly, and a thermal conductivity of the second thermally conductive component is not lower than that of the first thermally conductive component. The battery pack provided by the present application may achieve temperature uniformity while keeping the overall temperature of the battery pack low.

20 Claims, 6 Drawing Sheets

(51) Int. Cl.
    *H01M 10/647*     (2014.01)
    *H01M 10/6551*    (2014.01)
    *H01M 10/625*     (2014.01)
    *H01M 10/617*     (2014.01)
    *H01M 50/20*      (2021.01)
    *H01M 50/209*     (2021.01)

(52) U.S. Cl.
    CPC ..... *H01M 10/647* (2015.04); *H01M 10/6551* (2015.04); *H01M 10/6555* (2015.04); *H01M 50/20* (2021.01); *H01M 50/209* (2021.01)

(56) References Cited

U.S. PATENT DOCUMENTS

2016/0197385 A1     7/2016    Matsumoto et al.
2018/0062225 A1*    3/2018    You ..................... H01M 50/20

* cited by examiner

BATTERY PACK

CROSS-REFERENCE TO RELATED APPLICATIONS

The present application claims priority to Chinese Patent Application No. 201920175872.X, filed on Jan. 31, 2019, the content of which is incorporated herein by reference in its entirety.

FIELD

The present application relates to the technical field of battery, in particular, to a battery pack.

BACKGROUND

A battery pack generally includes a plurality of electrode assemblies connected together, the temperatures of the electrode assemblies in different locations of the battery pack are different. This is because the electrode assembly at the edge position generates heat accumulation for the electrode assembly at the intermediate position, and the electrode assembly at the intermediate position has a longer heat transfer path than the electrode assembly at the edge position, so that the heat dissipation boundary condition is also worse. In liquid cooling, the accumulation of heat can be avoided by liquid flow control or piping arrangement at different locations. However, for the condition of natural heat dissipation, limited by the unity of the heat dissipation means, an effective method for the temperature uniformity of the battery pack has not been proposed yet.

At present, it is common practice to uniformly apply heat-dissipating aluminum sheets to all the surface of the electrode assemblies in the battery pack to transfer heat to a housing of the battery pack. However, the problem of this method is that the electrode assembly in the middle position of the battery pack also has a phenomenon of heat accumulation, so that the problem of large temperature difference of the electrode assemblies at different positions cannot be completely solved. For a battery pack having more than 10 electrode assemblies arranged side by side, when discharging at a high rate, the temperature difference between the electrode assemblies easily exceeds 5° C., which seriously affects the life of the battery pack.

Another way to solve the problem of large temperature difference between electrode assemblies in different positions is to use insulation measures to deteriorate the heat dissipation conditions of the electrode assemblies at the edge positions. However, this method will increase the overall temperature of the battery pack, and although the temperature uniformity is improved to some extent, it also brings about a problem that the temperature rise of the battery pack is large, which also causes a loss of the life of the battery pack.

SUMMARY

For the above problems in the related art, a battery pack is provided by the present application, which may achieve temperature uniformity while keeping the overall temperature.

According to one aspect of present application, a battery pack is provided, including a first battery and a second battery arranged in a stack, the second battery being closer to a center of the battery pack than the first battery in a stacking direction of the first battery and the second battery; wherein the first battery includes a first thermally conductive component and a first electrode assembly, the second battery includes a second thermally conductive component and a second electrode assembly, and a thermal conductivity of the second thermally conductive component is not lower than that of the first thermally conductive component.

By differential design for heat dissipation through a second battery near a center of the battery pack and a first battery away from the center, the above technical solution of the present application reduces the electrode assembly temperature at the center where heat is accumulated. Therefore, it is possible to achieve uniform temperature between the individual electrode assemblies in the battery pack while keeping the overall temperature of the battery pack low.

BRIEF DESCRIPTION OF THE DRAWINGS

In order to illustrate the technical solutions in the embodiments of the present disclosure or in the prior art more clearly, the drawings which are required to be used in the description of the embodiments of the present disclosure are briefly described below. It is obvious that the drawings described below are only some embodiments of the present disclosure. It is apparent to those of ordinary skill in the art that other drawings may be obtained based on the structures shown in accompanying drawings without inventive effort.

DETAILED DESCRIPTION

Figure 1:
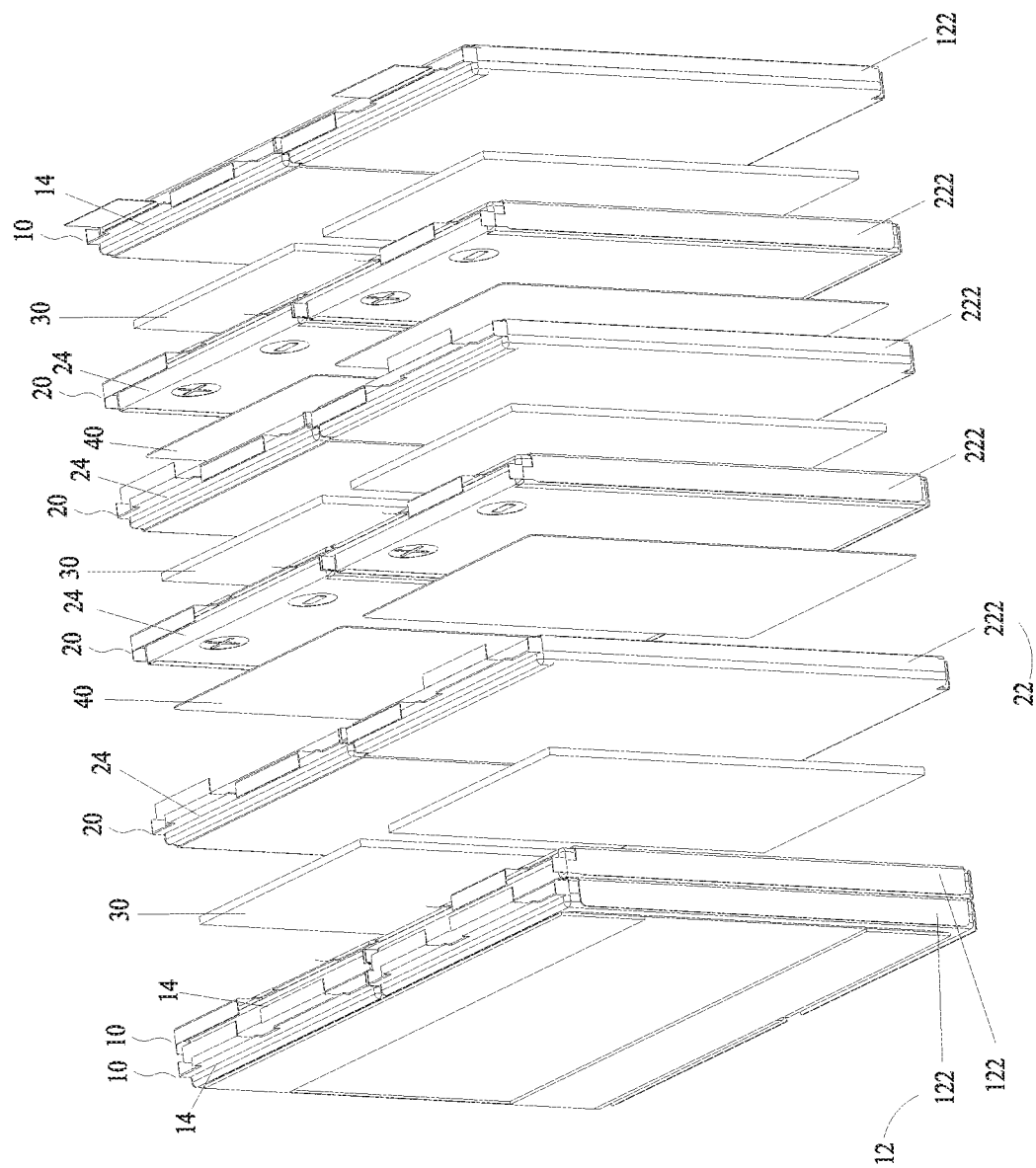
FIG. 1 is an exploded view of the battery pack according to a first embodiment of the present application.

The technical schemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. It should be understood that the respective exemplary embodiments in the following description and in the drawings may be combined with each other to form other embodiments not described below; and some of the components may be omitted in different embodiments. In other words, the following description does not limit the present application.

A battery pack according to an embodiment of the present application includes a first battery and a second battery, and the first battery and the second battery are stacked. In a stacking direction of the first battery and the second battery, the second battery is closer to a center of the battery pack than the first battery. The first battery includes a first thermally conductive component and a first electrode assembly, the second battery includes a second thermally conductive component and a second electrode assembly, and a thermal conductivity of the second thermally conductive component of the second battery is not lower than that of the first thermally conductive component of the first battery. By differential design for heat dissipation through a second battery near a center of the battery pack and a first battery away from the center, the above technical solution of the present application reduces the electrode assembly temperature at the center where heat is accumulated. Therefore, it is possible to achieve uniform temperature between the individual electrode assemblies in the battery pack while keeping the overall temperature of the battery pack low.

With reference to FIG. 1, an exploded view of the battery pack according to a first embodiment of the present application is shown. The battery pack 100 includes a first battery 10 and a second battery 20, and the first battery 10 and the second battery 20 are stacked. In a stacking direction of the first battery 10 and the second battery 20, the second battery 20 is closer to a center of the battery pack 100 than the first battery 10. The first battery 10 includes a first thermally conductive component 12 and a first electrode assembly 14, and the second battery 20 includes a second thermally conductive component 22 and a second electrode assembly 24. The first thermally conductive component 12 includes a first heat sink 122 and the second thermally conductive component 22 includes a second heat sink 222. Specifically, the first battery 10 includes a plurality of first heat sinks 122 and a plurality of first electrode assemblies 14, and at least one surface of each of the first electrode assemblies 14 is provided with the first heat sink 122. The second battery 20 includes a plurality of second heat sinks 222 and a plurality of second electrode assemblies 24, and at least one surface of each of the second electrode assemblies 24 is provided with the second heat sink 222. The structure and size of the first heat sink 122 and the second heat sink 222 may be the same. The number of the first battery 10 may be plural, and the number of the second battery 20 may be plural. It should be understood that the number of the first electrode assembly 14 and the second electrode assembly 24 shown in FIG. 1 is merely exemplary, and the first electrode assembly 14 and the second electrode assembly 24 may be any other suitable number. The number of the first battery 10 and the second battery 20 shown in FIG. 1 is merely exemplary, and the first battery 10 and the second battery 20 may also be any other suitable number. In an embodiment, the number of the first battery 10 may be different from the number of the second battery 20. In another embodiment, the number of the first battery 10 may be the same as the number of the second battery 20. Among them, the first electrode assembly 14 and the second electrode assembly 24 may be soft-pack batteries or square-shell batteries, which is not limited in this application.

In an embodiment, the thermal conductivity of the second thermally conductive component 22 of the second battery 20 is not lower than that of the first thermally conductive component 12 of the first battery 10. The difference between the thermal conductivity of the second thermally conductive component 22 and the thermal conductivity of the first thermally conductive component 12 is not less than 90% of the thermal conductivity of the first thermally conductive component 12.

It should be noted that the thermal conductivity of the first thermally conductive component and the second thermally conductive component may be tested according to the simulation data or the test data, so that the second electrode assembly near the center of the battery pack has the same heat dissipation efficiency as the first electrode assembly away from the center. Specifically, the heat dissipation efficiency η may be calculated by the following formula:

$$\eta = \Delta T/q;$$

That is, the heat dissipation efficiency may be expressed as a ratio of the temperature rise of the heat source to the heat generation power of the heat source. Among them, $\Delta T$ represents the temperature rise of the heat source relative to the ambient temperature, in °C.; q represents the heat production power of the heat source in W, which is used to characterize how much heat is generated by the heat source per unit time. When testing the heat dissipation efficiency of the first electrode assembly 14 and the second electrode assembly 24, it is assumed that the consistency of the first electrode assembly 14 and the second electrode assembly 24 is good, that is, the heat generation powers of the first electrode assembly 14 and the second electrode assembly 24 are the same, and comparing the heat dissipation efficiencies of the first electrode assembly 14 and the second electrode assembly 24 is to compare the temperature rise values of the first electrode assembly 14 and the second electrode assembly 24. When the temperature rise of the first electrode assembly 14 and the second electrode assembly 24 under the respective heat dissipation conditions is the same, it may be considered that the heat dissipation efficiency of the two is the same.

With continued reference to FIG. 1, the battery pack 100 further includes a buffer plate 30, and the buffer plate 30 is located between the first battery 10 and the second battery 20. In an embodiment, the buffer plate 30 may also be located between a plurality of first batteries 10. The buffer plate 30 may be a material having a cushioning effect such as foam. By providing the buffer plate 30, it is possible to reserve an expansion space for the first battery and the second battery while alleviating the problem of heat concentration of the second electrode assembly close to the center of the battery pack.

Figure 2:
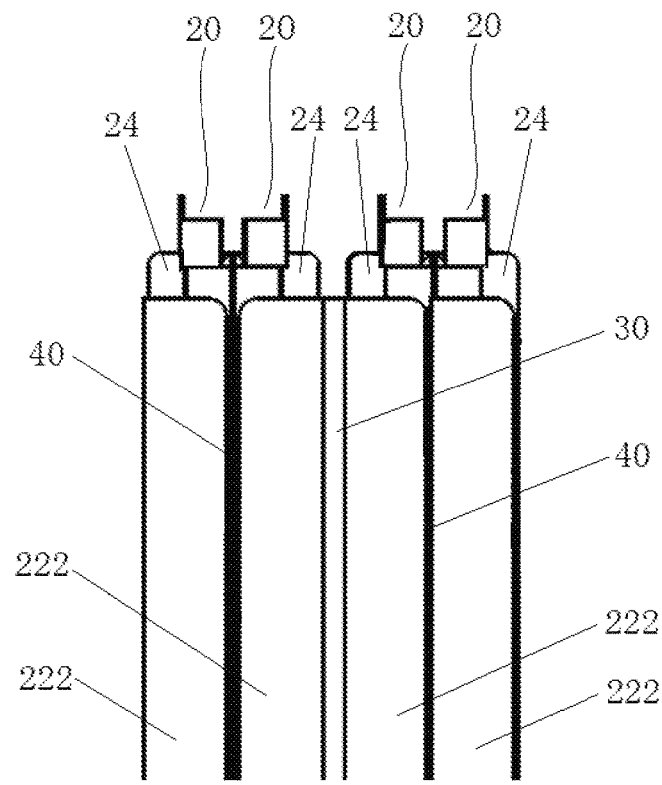
FIG. 2 is a partial enlarged view of a plurality of second batteries of the battery pack according to a first embodiment of the present application.

Further, with reference to FIG. 2, a thermally conductive plate 40 is also disposed between the adjacent two second electrode assemblies 24. In an embodiment, the thermally conductive plate 40 may be a metal plate. Optionally, the metal plate may be an aluminum plate. In an embodiment, the thermally conductive plate 40 may be a solid phase change plate. The solid phase change plate is a phase change material which is in a solid state when a phase transition occurs and whose original form is a sheet shape. In an embodiment, the thermally conductive plate 40 may be a thermally conductive gasket. Optionally, the thermally conductive gasket may be a thermally conductive gasket containing silicone. By providing the thermally conductive plate 40 between the second electrode assemblies 24, the heat dissipation efficiency of the second electrode assemblies 24 close to the center of the battery pack may be enhanced, so that the temperature of the second electrode assembly 24 in which heat is accumulated is lowered. Therefore, it is possible to achieve uniform temperature between the individual electrode assemblies in the battery pack while keeping the overall temperature of the battery pack low. A thickness of the thermally conductive plate may be based on simulation or test data such that the heat dissipation efficiency of the second electrode assembly 24 close to the center of the battery pack is about the same as the heat dissipation efficiency of the first electrode assembly 14 in the edge region.

In addition, the buffer plate 30 may also be located between the adjacent two second batteries 20. It should be understood that any suitable configuration of the arrangement of the thermally conductive plate 40 between the plurality of second electrode assemblies 20 may be performed, or any arrangement of the buffer plate 30 between the plurality of first batteries and the plurality of second batteries may be randomly and appropriately configured, and the present application is not limited thereto.

Figure 3:
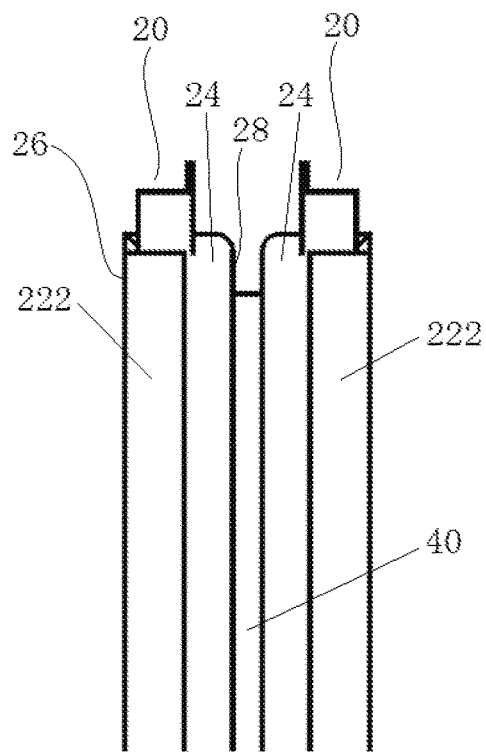
FIG. 3 is a partial enlarged view of two adjacent second batteries of the battery pack according to a first embodiment of the present application.

Referring to FIG. 3, the thermally conductive plate 40 and the second heat sink 222 are respectively located on opposite sides of the second electrode assembly 24. The second heat sink 222 may be bonded to a surface 26 of the second electrode assembly 24. The thermally conductive plate 40 contacts a first surface 28 of the second electrode assembly 24, and a contact area of the thermally conductive plate 40 and the second electrode assembly 24 may be greater than or equal to 90% of the area of the first surface 28, so as to ensure a sufficient heat dissipating area of the thermally conductive plate.

The thermally conductive plate 40 and the second electrode assembly 24 may be bonded and fixed by a thermally conductive adhesive. That is to say, the second heat sink 222 may be bonded to a surface 26 of the second electrode assembly 24 by a thermally conductive adhesive. The thermally conductive adhesive may include a thermally conductive silica gel, one-component thermally conductive paste and two-component thermally conductive gel, and may be made of a silicone rubber-based material, and filled with a highly thermally conductive metal oxide or other highly thermally conductive particles in the silicone rubber to simultaneously obtain the elasticity of the silicone rubber and the thermal conductivity of the filled particles. A thickness profile of the thermally conductive adhesive may be suitably configured to achieve sufficient bond strength while minimizing the thermal resistance of the thermally conductive adhesive. In an embodiment, a thickness of the thermally conductive adhesive is greater than 20 μm and less than 60 μm, for example 40 μm.

Figure 4:
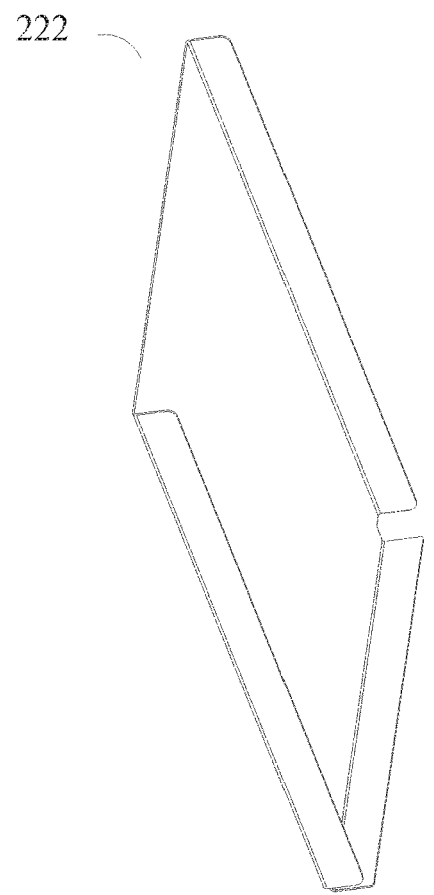
FIG. 4 is a schematic structural view of a second heat sink of the battery pack according to a first embodiment of the present application.

As shown in FIG. 4, the second heat sink 222 is configured in a U shape such that the second heat sink 222 may be located on three surfaces of the second electrode assembly 24. The structure of the second heat sink 222 may be designed such that the second heat sink 222 may be located on at least two surfaces of the second electrode assembly 24, such as on two or three surfaces of the second electrode assembly 24. In this way, a sufficient heat dissipation area of the second heat sink 222 may be ensured.

Figure 5:
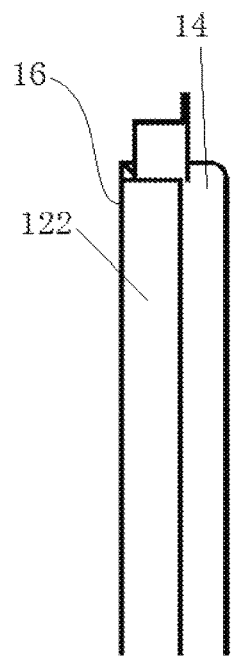
FIG. 5 is a partial enlarged view of a first battery of the battery pack according to a first embodiment of the present application.

As shown in FIG. 5, the first heat sinks 122 are bonded to a surface 16 of the first electrode assembly 14. The first heat sink 122 may be bonded to a surface 16 of the first electrode assembly 14 by a thermally conductive adhesive. Similar to the second heat sink 222, in an embodiment, the first heat sink 122 may have a structure as shown in FIG. 4. In some embodiments, the first heat sink 122 may be located on at least two surfaces of the first electrode assembly 14.

Figure 6:
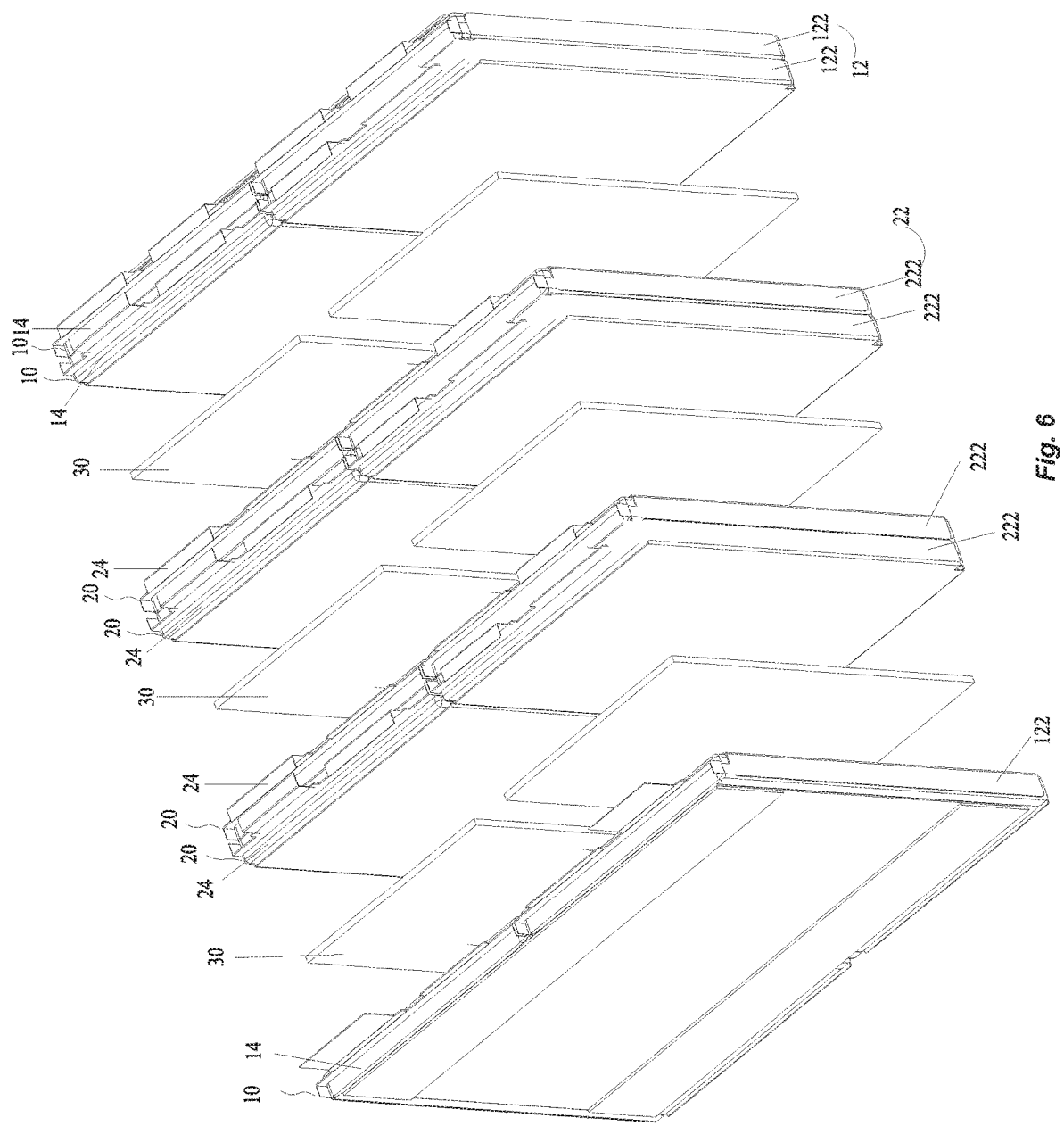
FIG. 6 is an exploded view of the battery pack according to a second embodiment of the present application.

With reference to FIG. 6, an exploded view of the battery pack according to a second embodiment of the present application is shown. The battery pack 200 includes a first battery 10 and a second battery 20, and the first battery 10 and the second battery 20 are stacked. In a stacking direction of the first battery 10 and the second battery 20, the second battery 20 is closer to a center of the battery pack 200 than the first battery 10. The first battery 10 includes a first thermally conductive component 12 and a first electrode assembly 14, and the second battery 20 includes a second thermally conductive component 22 and a second electrode assembly 24. The first thermally conductive component 12 includes a first heat sink 122 and the second thermally conductive component 22 includes a second heat sink 222. The first battery 10 includes a plurality of first heat sinks 122 and a plurality of first electrode assemblies 14, and at least one surface of each of the first electrode assemblies 14 is provided with the first heat sink 122. The second battery 20 includes a plurality of second heat sinks 222 and a plurality of second electrode assemblies 24, and at least one surface of each of the second electrode assemblies 24 is provided with the second heat sink 222. The battery pack 200 further includes a buffer plate 30, and the buffer plate 30 may be located between the first battery 10 and the second battery 20. The buffer plate 30 may also be located between the adjacent two second batteries 20.

A thermal conductivity of the second heat sink 222 is better than that of the first heat sink 122. The second heat sink 222 may have a thermal conductivity superior to that of the first heat sink 122 by a variety of implementable methods. Thus, the heat dissipation efficiency of the second electrode assemblies 24 close to the center of the battery pack may be enhanced, so that the temperature of the second electrode assembly in which heat is accumulated is lowered. Therefore, it is possible to achieve uniform temperature between the individual electrode assemblies in the battery pack while keeping the overall temperature of the battery pack low.

Figure 7A:
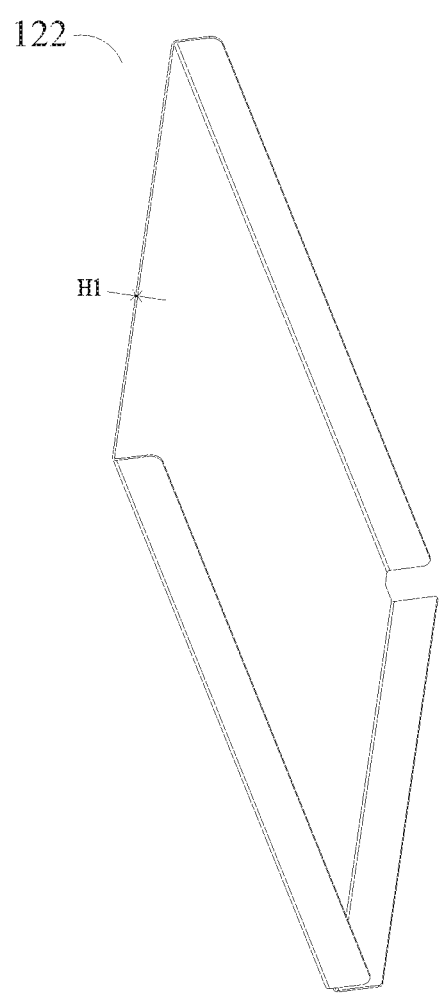
FIG. 7A is a schematic structural view of a first heat sink of the battery pack according to a second embodiment of the present application.
Figure 7B:
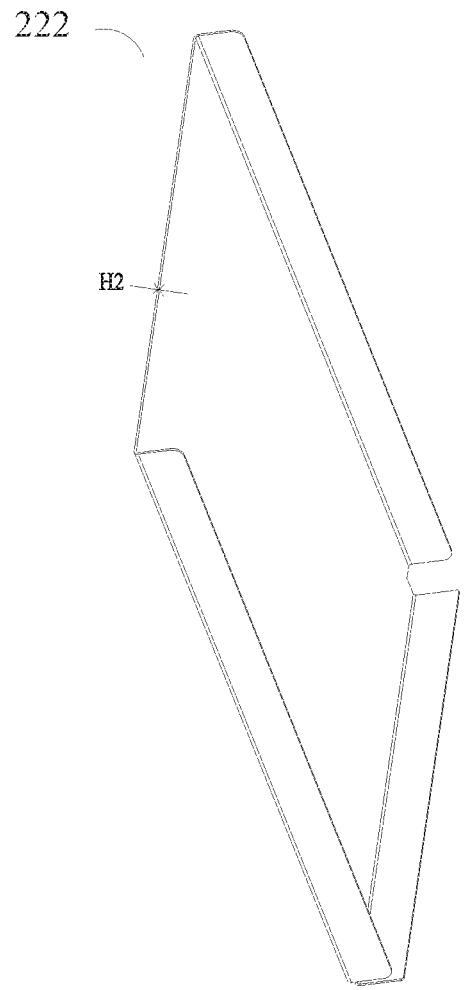
FIG. 7B is a schematic structural view of a second heat sink of the battery pack according to a second embodiment of the present application.

As shown in FIGS. 7A and 7B, the second heat sink 222 may be the same material as the first heat sink 122, and the second heat sink 222 has a thickness H2 while the first heat sink 122 having a thickness H1, the thickness H2 of the second heat sink 222 is greater than the thickness H1 of the first heat sink 122. The thickness H1 of the first heat sink 122 may be 0.2 mm-0.5 mm, and the thickness H2 of the second heat sink 222 may be 0.4 mm-1.0 mm. In an embodiment, the thickness H1 of the first heat sink 122 is 0.2 mm, and the thickness H2 of the second heat sink 222 is 0.5 mm. In another embodiment, the thickness H1 of the first heat sink 122 is 0.4 mm, and the thickness H2 of the second heat sink 222 is 0.8 mm. Other suitable designs may be made for the thickness H1 of the first heat sink 122 and the thickness H2 of the second heat sink 222 according to the temperature rise simulation data and the test data. By differentiated design for the thicknesses of the first heat sink 122 and the second heat sink 222, the thickness H2 of the second heat sink 222 is greater than the thickness H1 of the first heat sink 122, so that the heat dissipation effect of the second electrode assembly close to the center of the battery pack is enhanced, thereby achieving uniform temperature between the respective electrode assemblies in the battery pack.

Other aspects of the battery pack 200 of the second embodiment may be similar to the battery pack 100 of the first embodiment, and are not described herein again.

Figure 8:
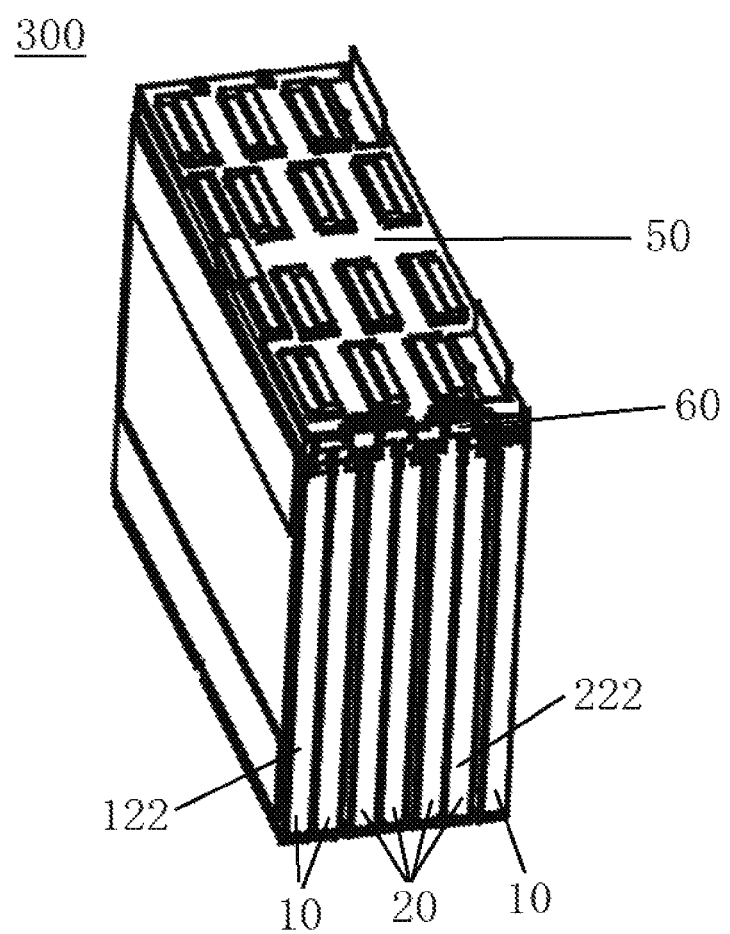
FIG. 8 is a schematic structural view of the battery pack according to an embodiment of the present application.

With reference to FIG. 8, a schematic structural view of the battery pack according to an embodiment of the present application is shown. A top of the plurality of first batteries 10 and second batteries 20 of the battery pack 300 are provided with an adapter plate 50. A buffer layer 60 is disposed between the adapter plate 50 and a plurality of first battery 10 and the second battery 20, and the buffer layer 60 may be a material such as foam, the buffer layer 60 serving as a support for the adapter plate 50 and acting as an insulator between a plurality of electrode assemblies.

In addition, the battery pack 300 may further include a housing connected to the first heat sink 122 and the second heat sink 222, and the housing may be a metal housing. A pressure may be applied between the housing and the plurality of first batteries 10 and the second batteries 20 by screws, so that the first heat sink 122 may be contact with an inner surface of the housing tightly. In an embodiment, a thermally conductive material may be filled between the first heat sink 122 and the second heat sink 222 and the housing.

The foregoing is only preferred exemplary embodiments of the present application and is not intended to be limiting of the present application, and any modifications, equivalent substitutions, improvements and the like within the spirit and principles of the present application are intended to be embraced by the protection range of the present application.

What is claimed is:

1. A battery pack, comprising a first battery and at least three second batteries, a thermally conductive plate, and a buffer plate arranged in a stack, the at least three second batteries being closer to a center of the battery pack than the first battery in a stacking direction of the first battery and the at least three second batteries; wherein the thermally conductive plate is sandwiched between a first of the at least three second batteries and a second of the at least three second batteries, the buffer plate is sandwiched between the second of the at least three second batteries and a third of the at least three second batteries, the thermally conductive plate and the buffer plate are arranged along the stacking direction, wherein the first battery comprises a first thermally conductive component and at least one first electrode assembly, each second battery comprises a second thermally conductive component and at least one second electrode assembly, and a thermal conductivity of the second thermally conductive component is not lower than that of the first thermally conductive component.

2. The battery pack according to claim 1, wherein the first thermally conductive component comprises at least one first heat sink, and the second thermally conductive component comprises at least one second heat sink; and at least one surface of one first electrode assembly is provided with one first heat sink.

3. The battery pack according to claim 2, wherein at least one surface of one second electrode assembly is provided with one second heat sink.

4. The battery pack according to claim 3, wherein the thermally conductive plate is arranged between two of the adjacent second electrode assemblies.

5. The battery pack according to claim 4, wherein the thermally conductive plate is any one of a metal plate, a solid phase change plate, and a thermally conductive gasket.

6. The battery pack according to claim 4, wherein the thermally conductive plate contacts a first surface of the at least one second electrode assembly, and a contact area of the thermally conductive plate and the at least one second electrode assembly is greater than or equal to 90% of an area of the first surface.

7. The battery pack according to claim 4, wherein the thermally conductive plate and the at least one second heat sink are respectively located on opposite sides of the at least one second electrode assembly.

8. The battery pack according to claim 1, wherein a difference between the thermal conductivity of the second thermally conductive component and the thermal conductivity of the first thermally conductive component is not less than 90% of the thermal conductivity of the first thermally conductive component.

9. The battery pack according to claim 1, wherein the first thermally conductive component comprises a first heat sink located on a surface of the first battery, and the second thermally conductive component comprises a second heat sink located on a surface of one second battery, and the thermal conductivity of the second heat sink is not lower than that of the first heat sink.

10. The battery pack according to claim 9, wherein a thickness of the second heat sink is greater than a thickness of the first heat sink.

11. The battery pack according to claim 10, wherein the second heat sink is of the same material as the first heat sink.

12. The battery pack according to claim 9, wherein the first heat sink is bonded to a surface of the first battery by a thermally conductive adhesive, and the second heat sink is bonded to a surface of the second battery by a thermally conductive adhesive.

13. The battery pack according to claim 1, further comprising a buffer plate located between the first battery and one of the at least three second batteries adjacent to the first battery.

14. The battery pack according to claim 1, further comprising a buffer plate located between adjacent two first batteries.

15. The battery pack according to claim 2, wherein the at least one first heat sink is located on at least two surfaces of the at least one first electrode assembly.

16. The battery pack according to claim 15, wherein the at least one first heat sink is configured in a U shape, and the at least one first heat sink is located on three surfaces of the at least one first electrode assembly.

17. The battery pack according to claim 3, wherein the at least one second heat sink is located on at least two surfaces of the at least one second electrode assembly.

18. The battery pack according to claim 17, wherein the at least one second heat sink is configured in a U shape, and the at least one second heat sink is located on three surfaces of the at least one second electrode assembly.

19. The battery pack according to claim 1, wherein the battery pack comprises a plurality of first batteries, and a number of batteries in the plurality of first batteries is different from that of the at least three second batteries.

20. The battery pack according to claim 3, further comprising a housing connected to the at least one first heat sink and the at least one second heat sink.

* * * * *